US012006902B2

(12) United States Patent
Bannur Nagaraja et al.

(10) Patent No.: US 12,006,902 B2
(45) Date of Patent: Jun. 11, 2024

(54) FUEL INJECTOR AND FUEL SYSTEM HAVING INTEGRAL FILTER SUPPORTED IN VALVE SEAT PLATE, AND VALVE SEAT PLATE AND FILTER ASSEMBLY

(71) Applicant: Caterpillar Inc., Peoria, IL (US)

(72) Inventors: Manjunath Bannur Nagaraja, Naperville, IL (US); Benjamin Ray Tower, Varna, IL (US); Venkata R. Tatikonda, Peoria, IL (US); Adam Charles Hill, Pontiac, IL (US)

(73) Assignee: Caterpillar Inc., Peoria, IL (US)

( * ) Notice: Subject to any disclaimer, the term of this patent is extended or adjusted under 35 U.S.C. 154(b) by 364 days.

(21) Appl. No.: 17/191,260

(22) Filed: Mar. 3, 2021

(65) Prior Publication Data

US 2022/0282692 A1 Sep. 8, 2022

(51) Int. Cl.

*F02M 61/16* (2006.01)
*F02M 37/00* (2006.01)
*F02M 61/12* (2006.01)
*F02M 61/18* (2006.01)

(52) U.S. Cl.

CPC ...... *F02M 61/165* (2013.01); *F02M 37/0047* (2013.01); *F02M 61/12* (2013.01); *F02M 61/1866* (2013.01)

(58) Field of Classification Search

CPC .. F02M 61/165; F02M 37/0047; F02M 61/12; F02M 61/1866
USPC .......................................................... 239/584
See application file for complete search history.

(56) References Cited

U.S. PATENT DOCUMENTS

| | | | | | |
|---|---|---|---|---|---|
| 5,944,262 | A * | 8/1999 | Akutagawa | F02M 61/168 239/585.4 |
| 5,996,910 | A * | 12/1999 | Takeda | F02M 51/0678 239/DIG. 19 |
| 6,412,713 | B2 * | 7/2002 | Okajima | F02M 51/005 239/585.4 |
| 6,434,822 | B1 * | 8/2002 | Perry | F02M 61/168 239/584 |
| 6,811,091 | B2 | 11/2004 | Dallmeyer et al. | |

(Continued)

FOREIGN PATENT DOCUMENTS

WO 2006018440 A1 2/2006

OTHER PUBLICATIONS

Anping County Weikai Filtration Tech Co. Ltd, Stainless Steel Fuel Injector Micro Basket Filter for Diesel Injector Repair Kit F509B 10.3x6.08x3.0 mm Pack of 200, Aug. 2020, Amazon, <https://www.amazon.com/Stainless-Injector-Basket-Filter-Diesel/dp/B08GZ48X9P> (Year: 2020).*

*Primary Examiner* — Joseph A Greenlund
*Assistant Examiner* — Kevin Edward Schwartz
(74) *Attorney, Agent, or Firm* — Brannon Sowers & Cracraft PC

(57) ABSTRACT

A fuel system for an internal combustion engine includes a pressurized fuel supply, and a fuel injector fluidly connected to the pressurized fuel supply. The fuel injector includes a valve seat plate forming a valve seat, an injection control valve, and a nozzle cavity. A filter, which can include a 2-dimensional filter, is positioned partially within the valve seat plate and partially within an injector body to filter an incoming flow of high-pressure fuel. The valve seat plate and filter are integrated in a valve seat plate and filter assembly.

10 Claims, 3 Drawing Sheets

(56) References Cited

U.S. PATENT DOCUMENTS

| | | | | |
|---|---|---|---|---|
| 6,834,667 | B2 * | 12/2004 | Sumiya | F02M 51/0671 29/888.41 |
| 7,070,127 | B2 | 7/2006 | Maier | |
| 7,434,567 | B2 | 10/2008 | Bonnah, II | |
| 8,500,045 | B2 | 8/2013 | Moore | |
| 10,830,196 | B2 | 11/2020 | Caceres | |
| 2005/0161537 | A1 * | 7/2005 | Mizuno | F02M 51/005 239/585.4 |
| 2007/0095953 | A1 * | 5/2007 | Bonnah, II | F02M 61/165 210/429 |
| 2011/0011955 | A1 * | 1/2011 | Moore | F02M 61/168 239/575 |
| 2015/0008271 | A1 | 1/2015 | Mack | |
| 2015/0136088 | A1 * | 5/2015 | Cavanagh | F02M 61/165 123/470 |
| 2017/0234284 | A1 * | 8/2017 | Cavanagh | F02M 61/165 239/574 |

* cited by examiner

FUEL INJECTOR AND FUEL SYSTEM HAVING INTEGRAL FILTER SUPPORTED IN VALVE SEAT PLATE, AND VALVE SEAT PLATE AND FILTER ASSEMBLY

TECHNICAL FIELD

The present disclosure relates generally to a fuel system for an internal combustion engine, and more particularly to a fuel injector having an integral filter supported in a valve seat plate.

BACKGROUND

Pressurized liquid fuel systems are used in many modern internal combustion engines. It is typical for a fuel system, such as for a compression-ignition diesel engine, to employ a plurality of fuel injectors each positioned to extend into a combustion cylinder in an engine for direct injection of highly pressurized fuel. It has been discovered that relatively high injection pressures and precise control over factors such as injection timing, injection rate shape, and injection amount can provide various advantages respecting emissions and fuel efficiency. In some diesel engines, fuel is maintained at a desired injection pressure in a pressurized fuel reservoir known generally as a common rail. Other fuel systems employ a plurality of pressurized fuel reservoirs that each supply fuel at an injection pressure to some, but less than all, of the fuel injectors in a fuel system. In still other configurations so-called unit pumps are associated one with each fuel injector and operated to pressurize fuel to an injection pressure in response to rotation of a cam, or sometimes by way of a hydraulically actuated plunger.

Fuel injector components are typically machined to relatively tight tolerances, and can be required to move rapidly as well as experience impacts with other components that can number into the millions or even billions over the course of an expected service life. Such fuel injector components are also subjected to fuel pressures which can be in excess of 200 Megapascals, as well as rapid changes in fuel pressure and sometimes potential cavitation phenomena. Fuel injectors can be highly sensitive to debris in an incoming flow of fuel. Particles such as metallic particles derived from components upstream of a common rail, notably pumps, can sometimes be introduced into the incoming flow of fuel. Other times particles can be present in fuel, introduced during service, or filters can fail or be defective. If such particles make their way into a fuel injector they can lodge between moving components, block valve seats, create flow obstructions, or otherwise cause performance degradation or failure. One debris-caused problem is the presence of a particle in or close to a nozzle spray orifice in a fuel injector that prevents proper closing of an associated outlet check, thereby disturbing outlet check motion or seating and/or potentially even causing the fuel injector to continuously inject or dribble fuel.

Engineers have developed a great many different strategies for filtering fuel in an effort to avoid the introduction of debris and problems of the sort set forth above. In one example strategy, a filter is placed in a connector that supplies fuel from a pressurized fuel reservoir to a high-pressure inlet of a fuel injector. Such filters may perform acceptably, but have their shortcomings and can require an extra piece that must be installed in the connector. In other approaches, filters have been placed into a fuel injector itself. U.S. Pat. No. 8,500,045 to Moore proposes a fuel injector having a fuel filter positioned within a passage leading to a control valve. Debris is apparently removed from the fuel and filtered fuel allowed to pass through to the control valve. Unfiltered fuel is purged during injection or removed from the injector via a drain. While the strategy set forth in Moore undoubtedly has applications, there is always room for improvement and development of alternative strategies.

SUMMARY OF THE INVENTION

In one aspect, a fuel injector includes an injector housing defining a longitudinal axis and having formed therein a high-pressure inlet, a nozzle supply cavity, a check control chamber, and nozzle spray orifices, and the fuel injector defining a low-pressure space. A direct operated nozzle check of the fuel injector is movable between an advanced position blocking the nozzle spray orifices from the nozzle supply cavity, and a retracted position where the nozzle spray orifices are open. An injection control valve of the fuel injector is movable between a closed position blocking the check control chamber from the low-pressure space, and an open position. The injector housing further includes a valve seat plate having formed therein a valve seat contacted by the injection control valve at the closed position, and a supply passage, and each of the nozzle supply cavity and the check control chamber is fluidly connected to the high-pressure inlet by way of the supply passage. A filter is supported in the valve seat plate and positioned to filter an incoming flow of high-pressure fuel through the supply passage from the high-pressure inlet.

In another aspect, a fuel system for an internal combustion engine includes a pressurized fuel supply, and a fuel injector defining a longitudinal axis and including an injector body having formed therein a high-pressure inlet fluidly connected to the pressurized fuel supply, and a direct operated nozzle check having a closing hydraulic surface exposed to a fluid pressure of a control chamber. The fuel injector further includes a valve seat plate forming a valve seat, an injection control valve movable from a closed position in contact with the valve seat, to an open position, to open the direct operated nozzle check, and a nozzle cavity, and a filter positioned partially within the valve seat plate and partially within the injector body to filter an incoming flow of high-pressure fuel.

In still another aspect, a valve seat plate and filter assembly for a fuel injector in a fuel system includes a valve seat plate defining a center axis extending between a first axial seat plate side and a second axial seat plate side. A valve seat is formed on the first axial seat plate side. A control pressure drain passage is centered about the center axis and extends between the first axial seat plate side and the second axial seat plate side to fluidly connect a check control chamber to the valve seat. A supply passage is spaced radially outward of the control pressure drain passage and extends between the first axial seat plate side and the second axial seat plate side, and a filter is supported in the supply passage and projects from the first axial seat plate side.

DETAILED DESCRIPTION

Figure 1:
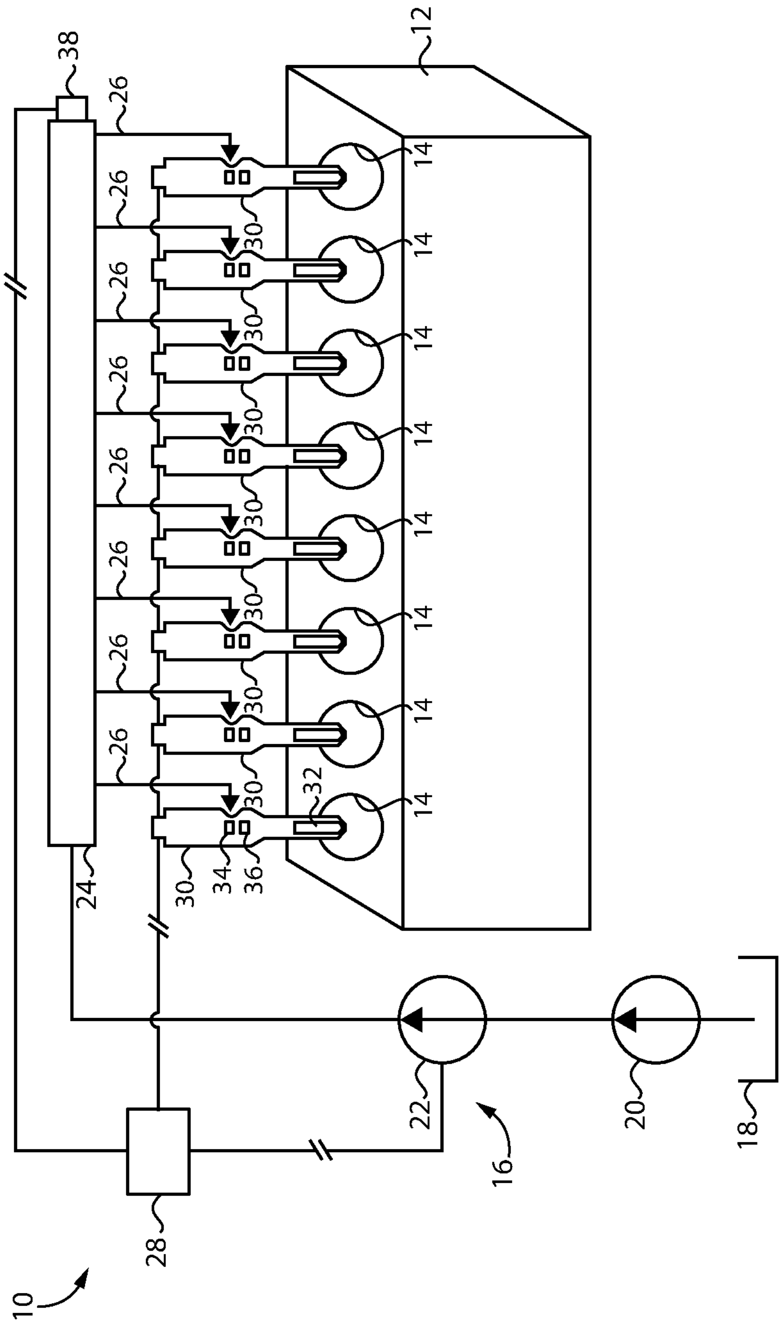
FIG. 1 is a diagrammatic view of an internal combustion engine system, according to one embodiment.

Referring to FIG. 1, there is shown an internal combustion engine system 10 according to one embodiment. Internal combustion engine system 10 may include a compression-ignition engine 12 structured to operate on a liquid fuel such as a diesel distillate fuel. In other instances, internal combustion engine system 10 could include a spark-ignited engine operating with a different liquid fuel type, a dual fuel engine, or still another. Internal combustion engine 12 includes a plurality of combustion cylinders 14 formed therein. Pistons (not shown) may be positioned within combustion cylinders 14 and movable between a top dead center position and a bottom dead center position in a conventional four-cycle pattern. The subject pistons may be coupled with a crankshaft that is rotated to propel a vehicle, drive a compressor, a pump, or an electrical generator, to name a few examples. Combustion cylinders 14 can be of any number and in any suitable arrangement such as an inline pattern, a V-pattern, or still another.

Internal combustion engine system 10 further includes a fuel system 16. Fuel system 16 includes a fuel supply or fuel tank 18, a low-pressure transfer pump 20, a high-pressure pump 22, and a pressurized fuel reservoir or common rail 24. Common rail 24 could be the sole pressurized fuel reservoir in fuel system 16, but in other embodiments a plurality of pressurized fuel reservoirs or accumulators coupled together in a so-called daisy chain arrangement might be used. In still other instances, fuel system 16 could include a plurality of unit pumps each operable to pressurize fuel for one or more individual fuel injectors. A plurality of feed lines 26 are fluidly connected to common rail 24 and extend to a plurality of fuel injectors 30 each positioned for direct injection of a liquid fuel, such as a diesel distillate fuel, into one of combustion cylinders 14.

Fuel injectors 30 may be substantially identical and interchangeable for service in internal combustion engine system 10. Fuel injectors 30, hereinafter referred to at times in the singular, may each include a direct operated nozzle check 32, an injection control valve assembly 34, and a valve seat plate and filter assembly 36. Fuel injectors 30 may be electronically controlled. An electronic control unit 28 is in control communication with each of fuel injectors 30. Electronic control unit 28 may also be in communication with a pressure sensor 38 coupled to pressurized fuel reservoir 24. Electronic control unit 28 may also be in control communication with high-pressure pump 22 and operable to maintain or vary a fuel pressure of common rail 24 by controlling high-pressure pump 22 in a generally known manner.

During operation, or over the course of a service life, of internal combustion engine system 10, debris may be introduced into fuel, either because fuel carrying debris is used to fill tank 18, because debris is produced by the interaction of contacting components in transfer pump 20, high-pressure pump 22, or elsewhere in the system, or for still another reason. Debris can also be introduced inadvertently during servicing as will be familiar to those skilled in the art. Fuel system 16 may be equipped with various filters at various locations. As will be further apparent from the following description, fuel system 16 is contemplated to provide superior filtering performance and simplified construction by way of valve seat plate and filter assemblies 36.

Figure 2:
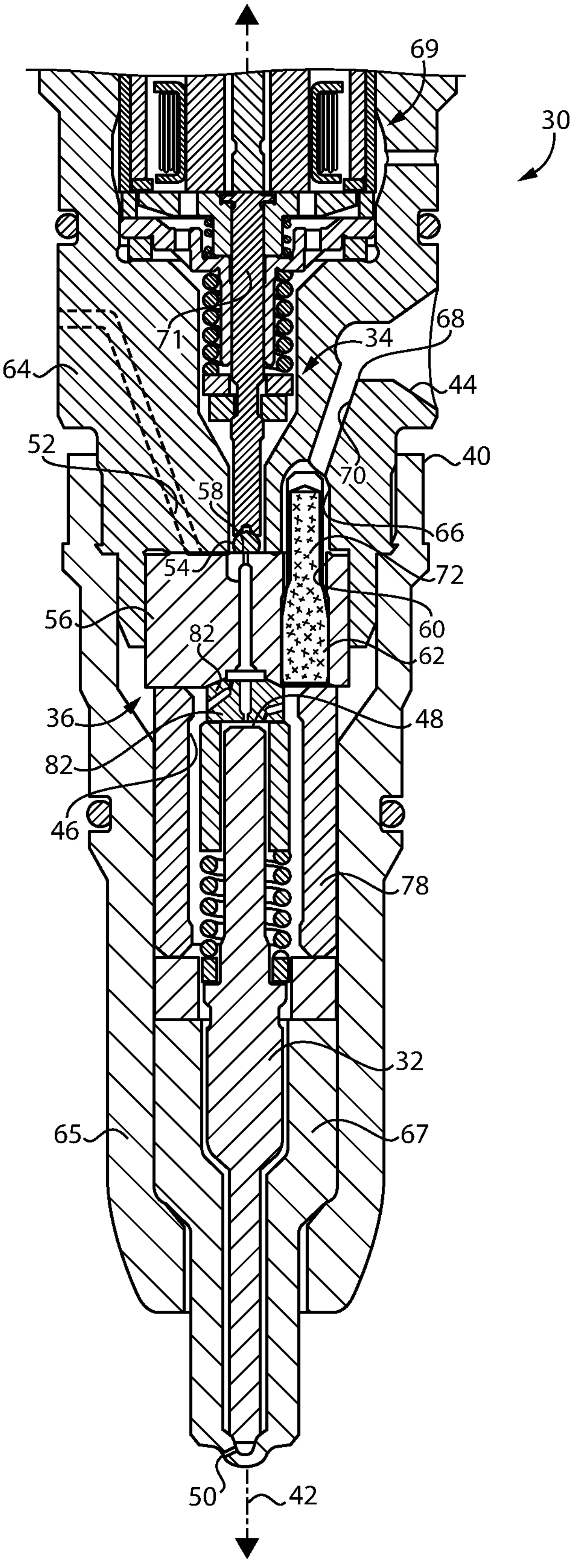
FIG. 2 is sectioned side diagrammatic view of a fuel injector, according to one embodiment.

Referring also now to FIG. 2, there are shown additional features of fuel injector 30 in greater detail. Fuel injector 30 includes an injector housing 40 defining a longitudinal axis 42, and having formed therein a high-pressure inlet 44, fluidly connected to common rail 24, a nozzle supply cavity 46, a check control chamber 48, and a plurality of nozzle spray orifices 50. Fuel injector 30 defines a low-pressure space 52. Low pressure space 52 can have the form of a low-pressure outlet from injector housing 40, a low-pressure cavity between or among components in fuel injector 30, or can be defined as a space anywhere outside of injector housing 40.

Fuel injector 30 further includes direct operated nozzle check 32 as noted above, movable between an advanced position blocking nozzle spray orifices 50 from nozzle supply cavity 46, and a retracted position where nozzle spray orifices 50 are open. Injection control valve assembly 34 includes an injection control valve 54 movable between a closed position blocking check control chamber 48 from low pressure space 52, and an open position. Injector housing 40 further includes a valve seat plate 56, part of valve seat plate and filter assembly 36, having formed therein a valve seat 58 contacted by injection control valve 54 at the closed position, and a supply passage 60. Each of nozzle supply cavity 46 and check control chamber 48 is fluidly connected to high-pressure inlet 44 by way of supply passage 60. A filter 62 is supported in valve seat plate 56, and forms a part of valve seat plate and filter assembly 36. Filter 62 is positioned to filter an incoming flow of high-pressure fuel through supply passage 60 from high-pressure inlet 44 to nozzle supply cavity 46, and to check control chamber 48, and to parts of injection control valve assembly 34.

Injector housing 40 further includes an injector body 64 attached to a nozzle case 65. Valve seat plate 56 is clamped between injector body 64 and nozzle case 65 and filter 62 projects from valve seat plate 56 into injector body 64. A clearance 66 extends circumferentially around filter 62 between filter 62 and injector body 64. Clearance 66 also extends axially between filter 62 and injector body 64. Injector housing 40 further includes a tip piece 67. Nozzle spray orifices 50 may be formed in tip piece 67, and can have any number in any suitable arrangement. Tip piece 67 may be positioned in nozzle case 65, such that engagement of injector body 64 with nozzle case 65, such as by a threaded clamping connection, clamps valve seat plate 56, tip piece 67, and a nozzle sleeve 78. Nozzle sleeve 78 is thus understood to be clamped between valve seat plate 56 and nozzle case 65.

Figure 3:
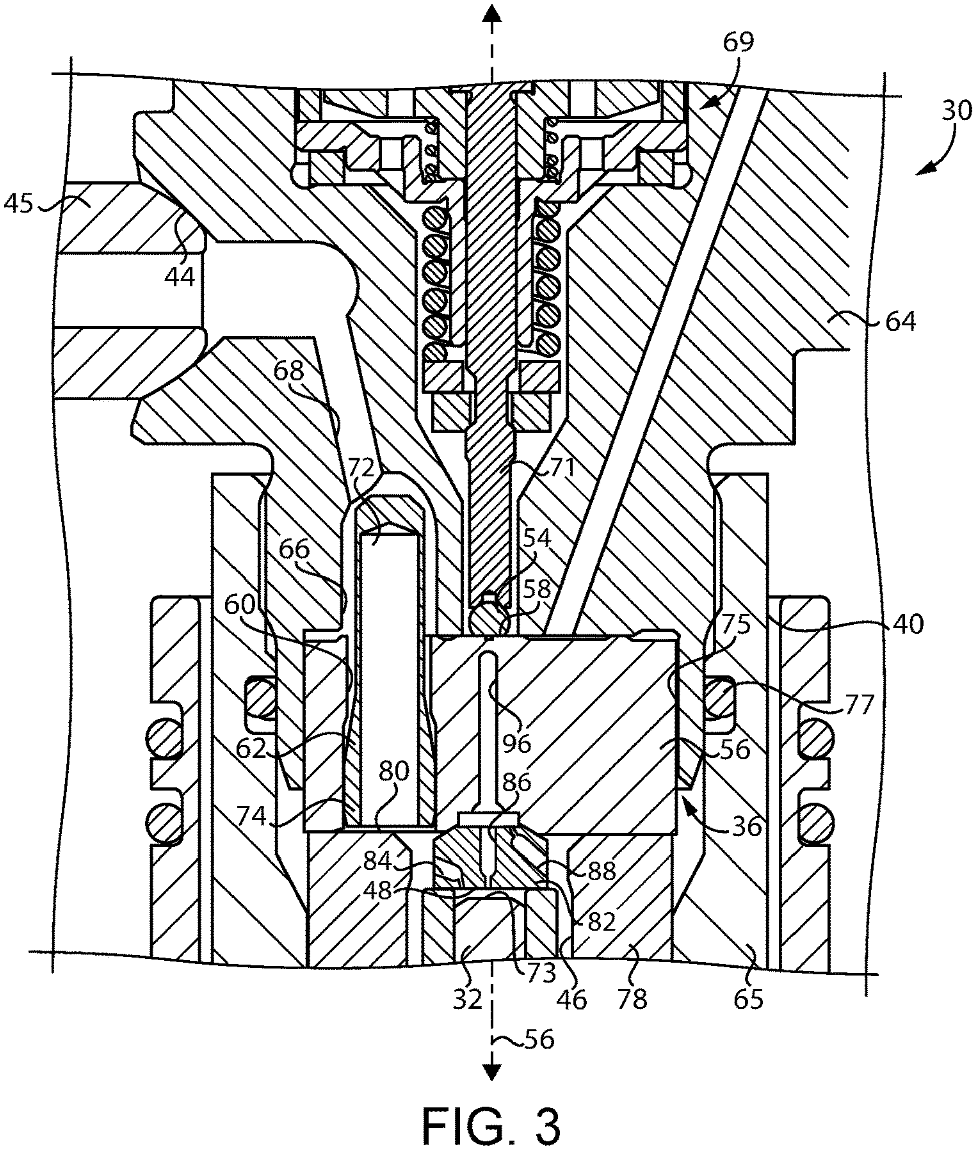
FIG. 3 is a sectioned side diagrammatic view of a fuel injector as in FIG. 2.

Referring also now to FIG. 3, nozzle sleeve 78 includes a top land 80 forming an axial stop positioned to limit axial displacement of filter 62. In the illustrated embodiment, injector housing 40 further includes an orifice piece 82 clamped between valve seat plate 56 and nozzle sleeve 78. Orifice piece 82 is separate from valve seat 56, however, in other embodiments the components could be integrated into a single part. Orifice piece 82 has formed therein a fill orifice 84 extending between nozzle supply cavity 46 and check control chamber 48, and fluidly connecting high-pressure inlet 44 to check control chamber 48. A drain orifice 86 may be formed in orifice piece 82, and a second fill orifice 88, as further discussed herein.

Additional features of fuel injector 30 shown in FIGS. 2 and 3 include a quill connector 45 that is, or connects to, one of feed lines 26, an electrical actuator 69 forming a part of injection control valve assembly 34, and a valve rod 71.

Electrical actuator 69 can be energized and deenergized to lift valve rod 71, that in turn enables opening of injection control valve 54 from valve seat 58 in the manner described. Nozzle check 32 includes a closing hydraulic surface 73 exposed to a fluid pressure of check control chamber 48. When injection control valve 54 is opened, with valve rod 71 lifted, low pressure will be connected to check control chamber 48. When electrical actuator 69 is deenergized valve rod 71 can push injection control valve 54 closed. Injection control valve 54 may be a flat-sided ball valve, or a spherical ball valve, for instance. A disc-shaped valve, or an injection control valve integrated with a valve rod or the like could be used in other embodiments. Injection control valve 54 is a two-way valve, although three-way valves may fall within the scope of the present disclosure.

Also in the illustrated embodiment, injector body 64 includes a bore 75 formed therein, and axially extending to receive valve seat plate 56. A seal 77, such as a conventional O-ring seal, extends circumferentially around injector body 64 and fluidly seals between injector body 64 and nozzle case 65. Also in the illustrated embodiment, nozzle case 65 is within a peripheral outside piece 79. Nozzle case 65 could be installed directly in an injector bore in an engine head, for example.

Returning to features and functionality of valve seat plate and filter assembly 36, it will be recalled that clearance 66 extends around filter 62. Filter 62 includes an outlet end 74 interference-fitted with valve seat plate 56 within supply passage 60, and an opposite second end 76 within injector body 64. An inlet passage 68 is formed in injector body 64 and includes an incoming portion 70 extending from high-pressure inlet 44, and an outgoing void portion 72. Outgoing void portion 72 extends from incoming portion 70 to supply passage 60, and is diametrically enlarged relative to incoming portion 70, meaning larger in diameter at least at some locations. As noted above, nozzle sleeve 78 includes top land 80 forming an axial stop positioned to limit axial displacement of filter 62. During service fuel injector 30 will experience high fluid pressures, changes in fluid pressure, and other harsh operating conditions. Filter 62 is interference-fitted, within supply passage 60, with valve seat plate 56. In the interest of preventing or limiting displacement of filter 62 during service, land 80 extends radially inward sufficiently to overlap radially, and circumferentially, a portion of filter 62. In this way, should filter 62 be urged out of position overcoming the interference fit, movement of filter 62 in injector housing 40 will be limited by contact with land 80. It will also be recalled clearance 66 surrounds a portion of filter 62. Opposite second end 62 will be free of contact in at least some embodiments with injector body 64. Thus, filter 62 will typically not contact injector body 64 at all. Filter 62 may include a 2-dimensional filter, and as can be seen from FIG. 3 includes a hollow interior that is open at outlet end 74, but ends blind at opposite second end 72. Filter 62 thus provides a screen against intrusion of particles larger than a predetermined size in at least two spatial dimensions.

Figure 4:
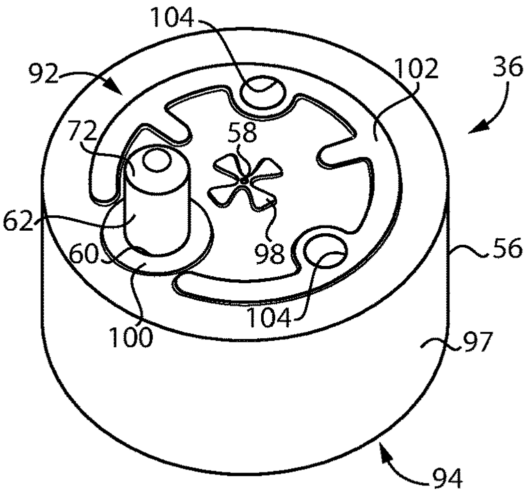
FIG. 4 is a perspective view of a valve seat plate and filter assembly, according to one embodiment.
Figure 5:
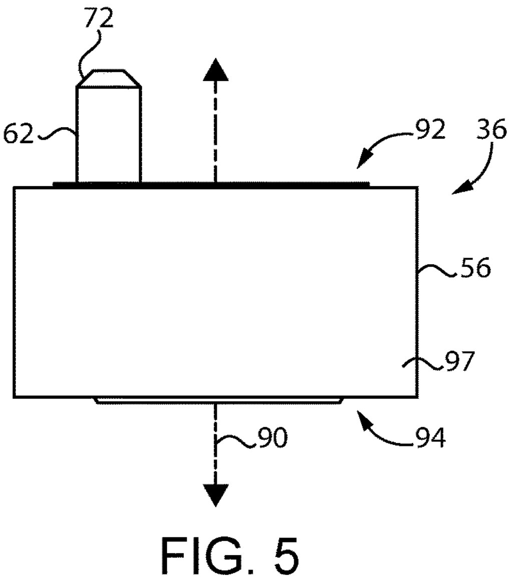
FIG. 5 is a side diagrammatic view of a valve seat plate and filter assembly, as in FIG. 4.

Referring also now to FIGS. 4 and 5, there are shown features of valve seat plate and filter assembly 36 in further detail. Valve seat plate 56 defines a center axis 90 extending between a first axial seat plate side 92 and a second axial seat plate side 94. Valve seat 58 is formed on first axial seat plate side 92. A control pressure drain passage 96 is centered about center axis 90 and extends between first axial seat plate side 92 and second axial seat plate side 94 to fluidly connect check control chamber 48 to valve seat 58. Supply passage 60 extends between first axial seat plate side 92 and second axial seat plate side 94, and is spaced radially outward of control pressure drain passage 96. Filter 62 is supported in supply passage 60 and projects from first axial seat plate side 92. Valve seat plate 56 includes an outer peripheral surface 97 extending circumferentially around center axis 90. Outer peripheral surface 97 may be cylindrical as shown. Outlet end 74 of filter 62 is adjacent to second axial seat plate side 94, and opposite second end 76 is located outside of valve seat plate 56.

Valve seat plate 56 further includes a first raised sealing surface 98 formed on first axial seat plate side 92. First raised sealing surface 98 extends circumferentially around valve seat 58. A second raised sealing surface 100 is formed on first axial seat plate side 92 and extends circumferentially around supply passage 60 and circumferentially around filter 62. A third raised sealing surface 102 is formed on first axial seat plate side 92. A plurality of dowel holes 104 originate on first axial seat plate side 92 within third raised sealing surface 102 and extend to second axial seat plate side 94. Dowels (not shown) can be fitted in dowel holes 104 and received in corresponding holes in injector body 64, for example, when valve seat plate and filter assembly 36 is installed for service in fuel injector 30.

INDUSTRIAL APPLICABILITY

Referring to the drawings generally, during operation of internal combustion engine system 10, high-pressure pump 22 is operated to receive fuel from transfer pump 20 and pressurize the fuel to an injection pressure to be provided in common rail 24. Electronic control unit 28 can function to adjust high-pressure pump 22, such as by inlet metering or outlet metering, to maintain or vary fuel pressure of common rail 24. Quill connector 45 conveys a flow of pressurized fuel to high-pressure inlet 44. The high-pressure fuel flows through inlet passage 68 and is filtered by filter 66 as it passes through valve seat plate 56. The continuous supply of pressurized fuel maintains nozzle supply cavity 46 at high pressure. Fill orifice 84 fluidly connects nozzle supply cavity 46 to check control chamber 48. Second fill orifice 88 fluidly connects supply cavity 46 to an upper side of orifice piece 82, thereby enabling filling of drain passage 96 and drain orifice 86, and contributing to filling of check control chamber 48.

A high pressure of fuel in control chamber 48 acts on closing hydraulic surface 73 to maintain outlet check 32 closed. When electrical actuator 69 is energized, injection control valve 54 can lift to open valve seat 58 and enable a rapid drop in pressure in check control chamber 48. With pressure in control chamber 48 reduced, outlet check 32 can lift to initiate an injection of fuel from fuel injector 30. During this time fuel will flow from high-pressure inlet 44 into nozzle supply cavity 46 and to other fluidly connected points in fuel injector 30. When electrical actuator 69 is deenergized, injection control valve 54 closes to block valve seat 58, and pressure is restored in check control chamber 48 to the high pressure by the incoming flow of fuel. During the flowing of fuel from high-pressure inlet 44 into fuel injector 30, filter 62 traps particulates that might otherwise make their way to nozzle spray outlets 50, or potentially into orifices of orifice piece 82 where such particulates can cause performance degradation.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel injector comprising:

an injector housing defining a longitudinal axis and having formed therein a high-pressure inlet, a nozzle supply cavity, a check control chamber, and nozzle spray orifices, and the fuel injector defining a low pressure space;

a direct operated nozzle check movable between an advanced position blocking the nozzle spray orifices from the nozzle supply cavity, and a retracted position where the nozzle spray orifices are open;

an injection control valve movable between a closed position blocking the check control chamber from the low pressure space, and an open position;

the injector housing further including a valve seat plate having formed therein a valve seat contacted by the injection control valve at the closed position, and a supply passage, and each of the nozzle supply cavity and the check control chamber is fluidly connected to the high-pressure inlet by way of the supply passage; and a filter supported in the valve seat plate and positioned to filter an incoming flow of high-pressure fuel through the supply passage from the high-pressure inlet to both the nozzle supply cavity and the check control chamber;

wherein the filter includes an open outlet end interference-fitted with the valve seat plate, and an opposite second end that is blind;

wherein the injector housing includes an injector body attached to a nozzle case, and the valve seat plate is clamped between the injector body and the nozzle case and the filter projects from the valve seat plate, such that the opposite second end is within the injector body; and wherein a clearance extends between the filter and the injector body, such that the filter does not contact the injector body.

2. The fuel injector of claim 1 wherein the clearance extends circumferentially around the filter between the filter and the injector body, and axially between the filter and the injector body.

3. The fuel injector of claim 2 wherein an inlet passage is formed in the injector body and includes an incoming portion extending from the high-pressure inlet, and an outgoing void portion extending from the incoming portion to the supply passage and diametrically enlarged relative to the incoming portion.

4. The fuel injector of claim 1 wherein the filter includes a 2-dimensional filter.

5. The fuel injector of claim 1 wherein the injector housing further includes a nozzle sleeve clamped between the valve seat plate and the nozzle case, and the nozzle sleeve includes a top land forming an axial stop positioned to limit axial displacement of the filter.

6. The fuel injector of claim 5 wherein the injector housing further includes an orifice piece clamped between the valve seat plate and the nozzle sleeve, and the orifice piece having formed therein a fill orifice extending between the nozzle supply cavity and the check control chamber and fluidly connecting the high-pressure inlet to the check control chamber.

7. A fuel injector comprising:

an injector housing defining a longitudinal axis and having formed therein a high-pressure inlet, a nozzle supply cavity, a check control chamber, and nozzle spray orifices, and the fuel injector defining a low pressure space;

a direct operated nozzle check movable between an advanced position blocking the nozzle spray orifices from the nozzle supply cavity, and a retracted position where the nozzle spray orifices are open;

an injection control valve movable between a closed position blocking the check control chamber from the low pressure space, and an open position;

the injector housing further including a valve seat plate having formed therein a valve seat contacted by the injection control valve at the closed position, and a supply passage, and each of the nozzle supply cavity and the check control chamber is fluidly connected to the high-pressure inlet by way of the supply passage; and a filter supported in the valve seat plate and positioned to filter an incoming flow of high-pressure fuel through the supply passage from the high-pressure inlet;

wherein the filter defines a filter longitudinal axis, and a clearance extends circumferentially around the filter longitudinal axis and in a radial direction defined by the filter longitudinal axis between the filter and the injector housing;

wherein the filter includes an open outlet end interference-fitted with the valve seat plate, and an opposite second end that is blind and is oriented towards the incoming flow of high-pressure fuel; and wherein the injector housing includes an injector body attached to a nozzle case, and the valve seat plate is clamped between the injector body and the nozzle case and the filter projects from the valve seat plate, such that the opposite second end is within the injector body, and the clearance is defined between the opposite second end and the injector body.

8. The fuel injector of claim 7 wherein the filter includes a hollow interior extending between the open outlet end and the opposite second end.

9. The fuel injector of claim 7 wherein the clearance extends in the radial direction between the filter and the valve seat plate.

10. A fuel injector comprising:

an injector housing defining a longitudinal axis and having formed therein a high-pressure inlet, a nozzle supply cavity, a check control chamber, and nozzle spray orifices, and the fuel injector defining a low pressure space;

the injector housing further including a valve seat plate having formed therein a valve seat, and a supply passage, and each of the nozzle supply cavity and the check control chamber is fluidly connected to the high-pressure inlet by way of the supply passage; and a filter supported in the valve seat plate and positioned to filter an incoming flow of high-pressure fuel through the supply passage from the high-pressure inlet;

wherein the filter defines a filter longitudinal axis, and a clearance extends circumferentially around the filter longitudinal axis and in a radial direction defined by the filter longitudinal axis between the filter and the injector housing;

wherein the filter includes an open outlet end interference-fitted with the valve seat plate, and an opposite second end that is blind and oriented towards the incoming flow of high-pressure fuel; and wherein the injector housing includes an injector body attached to a nozzle case, and the valve seat plate is clamped between the injector body and the nozzle case and the filter projects from the valve seat plate, such that the opposite second end is within the injector body, and the clearance is defined between the opposite second end and the injector body.

* * * * *